United States Patent [19]

Okada

[11] Patent Number: 5,566,285
[45] Date of Patent: Oct. 15, 1996

[54] IMAGE PROCESSING APPARATUS CAPABLE OF MAPPING TEXTURE TO EACH POLYGON OF A THREE DIMENSIONAL IMAGE

[75] Inventor: Masahiro Okada, Kobe, Japan

[73] Assignee: Konami Co., Ltd., Hyogo-ken, Japan

[21] Appl. No.: 342,550

[22] Filed: Nov. 21, 1994

[30] Foreign Application Priority Data

Nov. 22, 1993 [JP] Japan ..................... 5-292108

[51] Int. Cl.⁶ .................................. G06T 15/00
[52] U.S. Cl. .................. 395/130; 395/119; 395/125
[58] Field of Search ..................... 395/130, 119, 395/120–132, 133, 135

[56] References Cited

U.S. PATENT DOCUMENTS 5,179,638 1/1993 Dawson et al. ................ 395/125
5,226,109 7/1993 Dawson et al. ................ 395/120

FOREIGN PATENT DOCUMENTS 2-219184 8/1990 Japan .

*Primary Examiner*—Almis R. Jankus
*Attorney, Agent, or Firm*—Frank J. Jordan; Jordan and Hamburg

[57] ABSTRACT

An image processing apparatus used with a display device having a number of pixels arranged in a predetermined form includes a surface model creating processor operable to create a surface model which is defined by a number of polygons with each polygon having a surface number and a parameter. A frame memory has addresses corresponding to the pixels of the display device, and is operable to store a surface number at each address to represent the surface model in terms of surface numbers. A polygon parameter memory is operable to store the parameter of each polygon, and a texture data memory is operable to store texture data for each polygon at addresses arranged in a predetermined form. A calculator is operable to calculate, based on a designated address of the first memory and the parameter of the polygon corresponding to the surface number at the designated address, an address of the third memory storing texture data corresponding to the designated address. The calculator is also operable to generate and send an address signal indicative of the calculated address to the third memory so as to transmit the texture data stored at the calculated address to the display device.

4 Claims, 3 Drawing Sheets

IMAGE PROCESSING APPARATUS CAPABLE OF MAPPING TEXTURE TO EACH POLYGON OF A THREE DIMENSIONAL IMAGE

BACKGROUND OF THE INVENTION

This invention relates to an image processing apparatus using a surface model for generating a three-dimensional image on a display device, and more particularly to an image processing technology of mapping texture of color, design, pattern, etc to each polygon.

In the field of computer graphics, in particular, electronic game machines, a recent trend is to give operators realistic impressions by using a three-dimensional scene display technology.

FIG. 3 is a schematic block diagram showing a conventional image processing apparatus. This apparatus is comprised from a processor 10, a data memory 11 for storing texture data, a polygon mapping circuit 12, and a frame memory 13 for storing image data of one frame. The frame image data stored in the frame memory 13 is transmitted to display device (not shown).

In the conventional image processing apparatus, the processor 10 executes modeling transformation, projection transformation or the like transformation on the basis of operational data generated in accordance with the game program or operator's manipulation to create data of a polygon of a surface model and sends the data to the polygon mapping circuit 12.

The polygon mapping circuit 12 reads a texture data corresponding to a surface number of the polygon, executes mapping of the read texture on the polygon, and sends the texture-mapped polygon data to a frame memory 13. The frame memory 13 accumulates a predetermined number of texture-mapped polygon data to create image data of one frame and sends the one frame image data to the display device.

In the process of creating a surface model, hidden-surface elimination operation is executed. The hidden-surface elimination operation is generally carried out when two objects are overlapped with each other, to discriminate a foreground object from a background object by giving priority to the former one between the two. The hidden-surface elimination operation is very complicated.

In the conventional image processing apparatus, texture mapping operation is executed for polygons of a surface model one after another. This will complicate the texture mapping. If a scene to be generated contains a greater number of overlapped objects, more calculation will be forcibly required for not only the hidden-surface elimination operation but also the texture mapping operation, thus resulting in an increased image processing time.

To solve this problem, for example, Japanese Unexamined Patent Publication No. 2-219184 disclose a parallel processing for hidden-surface elimination operation to reduce the time for elimination. However, such a parallel structure processing causes complicated structure, larger size, and higher costs.

SUMMARY OF THE INVENTION

An object of the present invention is to provide an image processing apparatus which is effective in overcoming the above-mentioned problems.

Another object of the present invention is to provide an image processing apparatus which is simpler in structure and smaller in size, and faster in processing speed.

The present invention is directed to an image processing apparatus for use with a display device having a number of pixels arranged in a predetermined form, the processing apparatus is comprised from: a processor operable to create a surface model which is defined by a number of polygons, each polygon having a surface number and a parameter; a first memory having addresses corresponding to the pixels of the display device, and operable to store a surface number at each address to represent the surface model in terms of surface numbers; a second memory operable to store the parameter of each polygon; a third memory operable to store texture data for each polygon at addresses arranged in a predetermined form; a designator operable to designate an address of the first memory; and a calculator operable to calculate, based on a designated address of the first memory and the parameter of the polygon corresponding to the surface number at the designated address, an address of the third memory storing texture data corresponding to the designated address, and generate an address signal indicative of the calculated address of the third memory, and send the address signal to the third memory so that the third memory transmits the texture data stored at the calculated address to the display device.

The first memory and the second memory may be connected with the processor in parallel, and the first memory, the second memory, the calculator, the third memory, and the display device may be connected in series.

It may be preferable that the designator is provided in the processor and operable to generate and send a scanning signal to the first memory to scan the addresses of the first memory to designate addresses one after another in synchronism with a sweeping signal of the display device.

Further, it may be preferable that the processor is made to create a new surface model in accordance with externally input operation data, but the processing of a new surface model is suspended unless the predetermined interval of the sweeping signal elapses.

With such an image processing apparatus, a surface model is created by the processor, and the data is stored in the first memory in the term of surface numbers. The addresses of the first memory correspond to pixels arranged on the display device. The addresses of the first memory are scanned, and scanned addresses are successively sent to the second memory. The second memory stores parameters of polygons constituting the surface model, and successively reads out parameters of polygons of the successively sent surface numbers and sends to the calculator.

The calculator successively calculates, based on the scanned addresses and the parameters of the polygons having the surface numbers stored at the respective scanned addresses, the addresses of the third memory which store texture data corresponding to respective parts of each of the polygons. The calculator successively generates and sends address signals indicative of the calculated addresses to the third memory. The third memory successively sends texture data in accordance with the address signals to the display device to generate a three-dimensional image.

Accordingly, the mapping of texture data is executed in accordance with the scanning of the addresses of the first memory storing the created surface model data. Thus, this will simplify the processing of three-dimensional image, and need less time to process even a three-dimensional image having an increased number of polygons or overlapped polygons.

Further, the first memory, second memory, calculator, third memory, and display device are connected in series, which thus makes it easier to synchronize the three-dimensional image processing with the sweeping signal of the display device. Moreover, the new image processing is suspended until the interval of the sweeping signal elapses. Accordingly, the stable generation of images can be assured.

The above and other objects, features and advantages the present invention will become more apparent from the following detailed description which is to be read in conjunction with the accompanying drawings.

DETAILED DESCRIPTION OF THE PREFERRED EMBODIMENT OF THE INVENTION

A preferred embodiment of the present invention will be described in detail with reference to the accompanying drawings.

Figure 1:
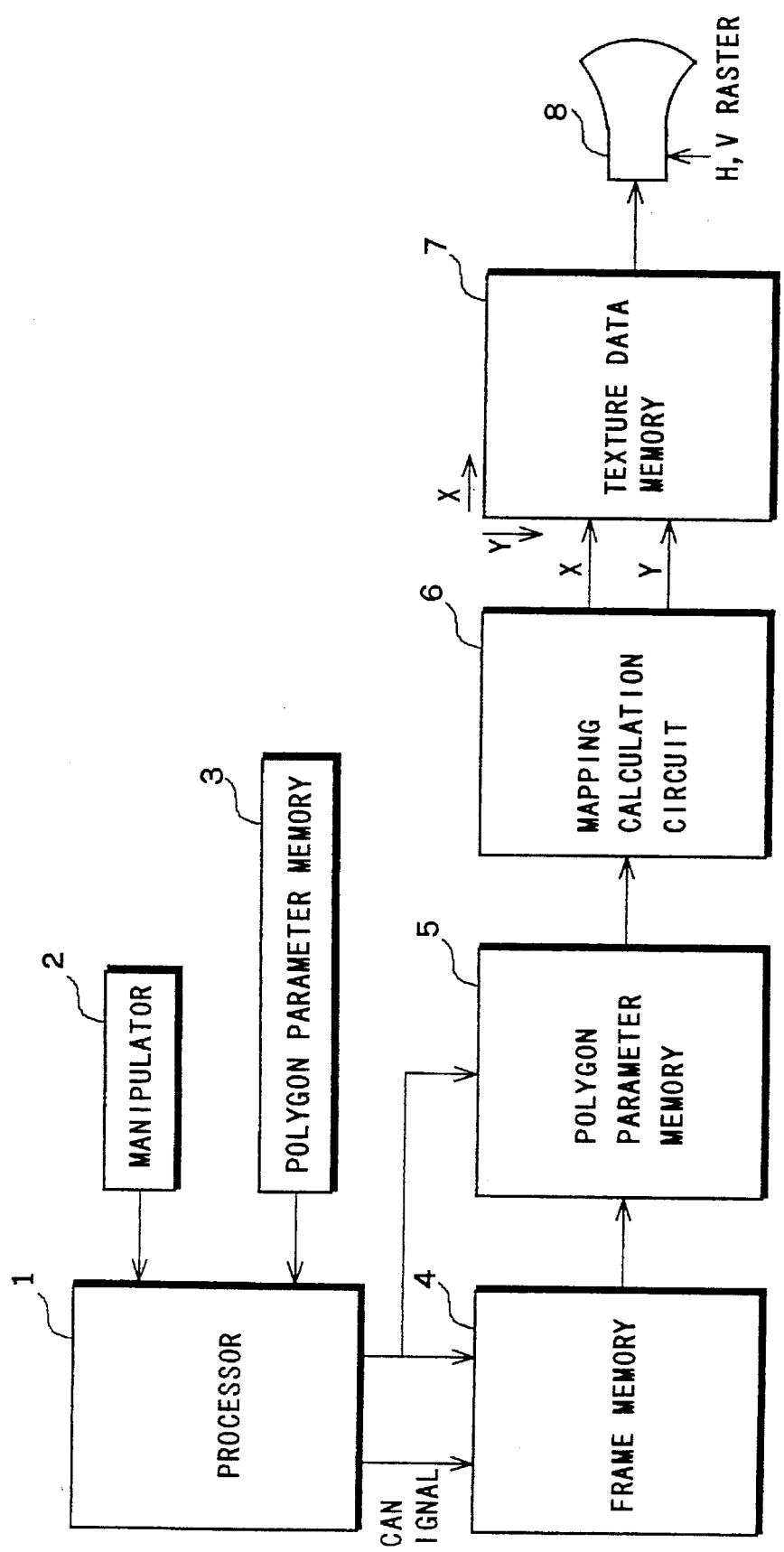
FIG. 1 is a block diagram showing a structure of an image processing apparatus of the present invention.

FIG. 1 is a block diagram showing an overall structure of an image processing apparatus in accordance with the present invention. In the drawing, a processor 1 includes a microcomputer and controls operations for performing a specified game in accordance with a game program. The processor 1 is connected to a manipulator 2 by which a game player manipulates actions of characters in the game. In the case of car racing, for example, the manipulator 2 provides the player with manipulation of various parts of a car, such as steering wheel, accelerator pedal, and braking pedal.

The processor 1 includes a calculator for calculating the shift amount and inclined or rotational amount of objects, i.e., characters in the same, in accordance with displacements of manipulator members, and calculating the shift amount, inclined amount, and enlargement and contraction scale of objects in the case of the viewing position of scene being changed in accordance with the game program.

The processor 1 is connected to a polygon parameter memory 3 which stores a number of polygon parameter defining each polygon, that is, information of a great number of polygons constituting objects in a scene, e.g., race road, race cars, background such as surrounding buildings or other facilities. A polygon generally represents a surface unit of an object. In other words, the surface of an object is dissected into a number of polygons. The polygon parameter includes a surface number and a vertex coordinate which identify each polygon.

The processor 1 executes calculation of movement, rotation or inclination and enlargement or contraction of each object based on the polygon parameters, game program, player's operational data input through the manipulator 2 to create new surface model data. The calculation includes modeling transformation, projection transformation, and other transformation which are well-known.

Further, the processor 1 executes calculation of eliminating hidden surfaces of objects overlapped with each other from a specified viewing position in a virtual three-dimensional space.

Thus created surface model data are sent to a frame memory 4 and a polygon parameter memory 5. The frame memory 4 has addresses corresponding to pixels (i.e. dots) of a display device 8 generating a created image, for example, first address corresponding to first dot. The frame memory 4 stores at each address a surface number of each polygon of the created surface model. In other words, the frame memory 4 two-dimensionally represents the surface model by the surface numbers.

Respective parameters of the polygons are stored in a polygon parameter memory 5 in relation to the surface numbers stored in the frame memory 4. The polygon parameters define the new surface model. In other words, the polygon parameters represent a movement of an object, that is, displacement, rotation or inclination, or enlargement and contraction of polygons.

Progress of the game is controlled by the processor 1 or other processor dedicated to game operation in accordance with the game program stored in a ROM (not shown).

The processor 1 generates a scanning signal in synchronism with horizontal and vertical raster sweepings of the display device 8. In response to this scanning signal, the frame memory 4 sends out a surface number at each scanned address to the polygon parameter memory 5.

The polygon parameter memory 5 sends out the polygon parameter corresponding to the input surface number together with the surface number to a mapping calculation circuit 6. The mapping calculation circuit 6 executes calculation to map texture or draw a scene on the basis of the sent surface numbers and polygon parameters.

Indicated at 7 is a texture data memory storing texture data for each polygon, such as color, design and pattern to be mapped onto each polygon, in an X-Y matrix address arrangement.

The mapping calculation circuit 6 generates an (X, Y) address designating a necessary texture data from the texture data memory 7. The designated texture data is read from the texture data memory 7 in synchronism with horizontal and vertical raster sweeping signals and then sent to the display device 8. By repeating this operation with respect to each dot at high speed, a processed scene is generated on the display device 8.

Next, one example of the mapping calculation will be described. The following matrix represents a factor concerning a rotational of a certain polygon.

$$\begin{bmatrix} r00 & r01 & r02 \\ r10 & r11 & r12 \\ r20 & r21 & r22 \end{bmatrix}$$

wherein:

r00=cosβcosγ−sinαsinβsinγ;

r01=cosβsinγ+sinαsinβcosγ;

r02=−cosαsinβ;

r10=−cosαsinγ;

r11=−cosαcosγ;

r12=sinα;

r20=sinβcosγ+sinαcosβsinγ;

r21=sinβsinγ−sinαcosβcosγ;

r22=cosαcosβ;

the coordinate is a right-handed coordinate system where a viewing point is on a positive direction of the z-axis, and the x-axis of a screen is rightward and the y-axis of the screen is downward;

an object is rotated in a counter-clockwise screw direction in the order of the y-, x- and z-axes; and α, β, and γ denote rotational angles of the x-, y-, and z-axes.

Using the matrix, coordinate values (X, Y) of a texture on the polygon can be expressed by the following equations:

$$X = \frac{(r01y - r11x) + (r11z - r21y) \, h/s + (r21x + r01z) \, v/s}{r22 + r02h/s + r12v/s}$$

$$Y = \frac{(r10x - r00y) + (r20y - r10z) \, h/s + (r00z + r20x) \, v/s}{r22 + r02h/s + r12v/s}$$

wherein h and v represent values of an H-V coordinate on the screen, respectively; x, y and z cooperatively represent a reference point when the viewing point is on the origin (0,0,0); and s represents a distance to the screen.

The above equations can be rewritten into the following equations.

$$X = \frac{Ax + Bx \, h + Cx \, v}{G + H \, h + I \, v}$$

$$Y = \frac{Ay + By \, h + Cy \, v}{G + H \, h + I \, v}$$

wherein Ax, Bx, Cx, Ay, By, Cy, G, H, I represent constants for each polygon, and h and v represent values of the H-V coordinate on the screen, respectively.

It should be noted that nine constants are polygon parameters of each polygon, and h and v coordinate values are scanned address data of the frame memory 4.

In synchronism with the horizontal and vertical raster sweeping signals, surface numbers are successively sent from the frame memory 4 to the polygon parameter memory 5. Subsequently, nine constants corresponding to each of the successively sent surface numbers are sent from the polygon parameter 5 to the mapping calculation circuit 6. The mapping calculation circuit 6 executes the above calculation based on the sent nine constants (i.e., polygon parameters) and h and v coordinate values (i.e., scanned address data) to generate an address signal indicative of designating an appropriate address (X, Y) on the texture data memory 7.

Figure 2:
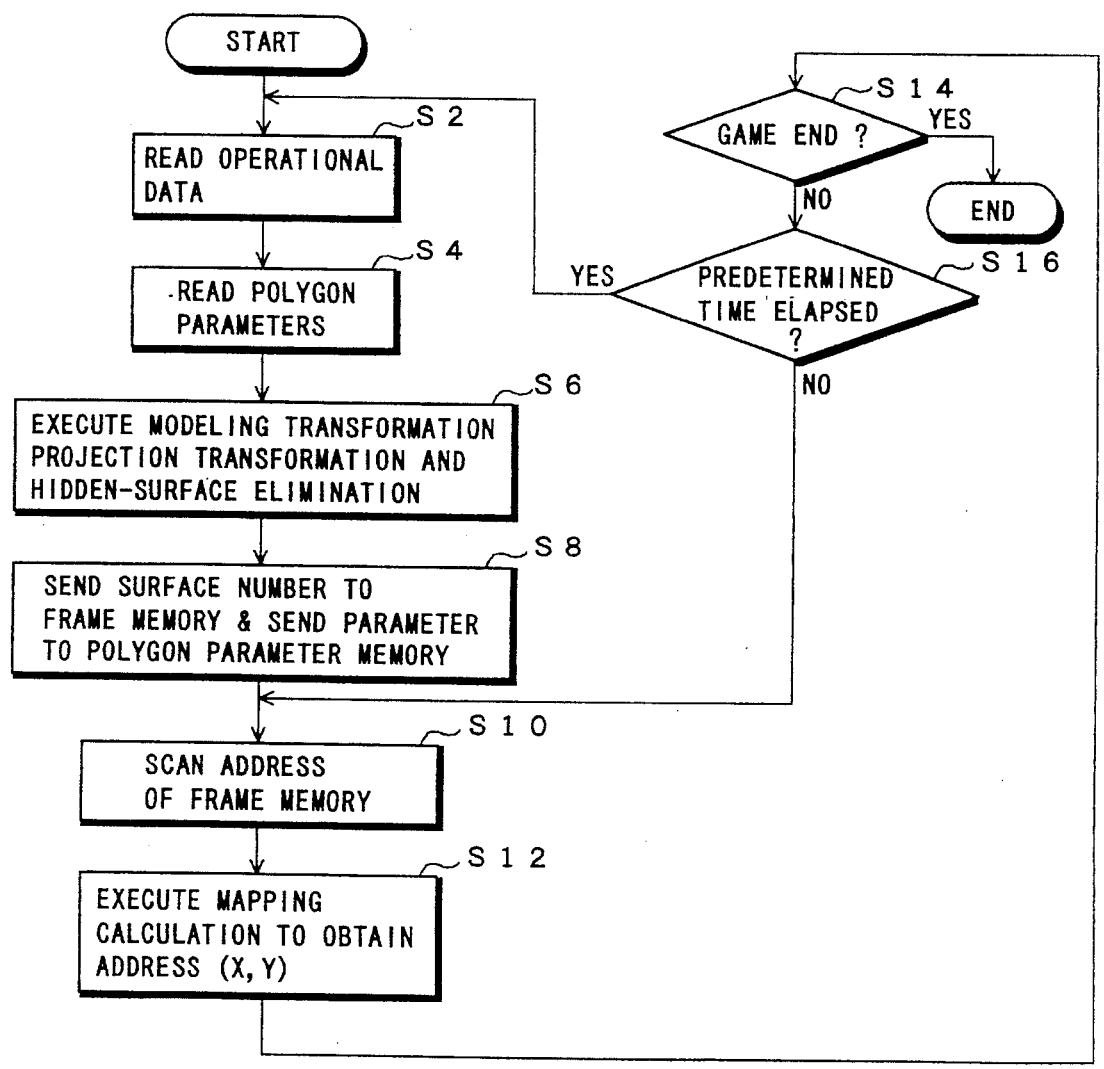
FIG. 2 is a flowchart showing operations of the image processing apparatus.
Figure 3:
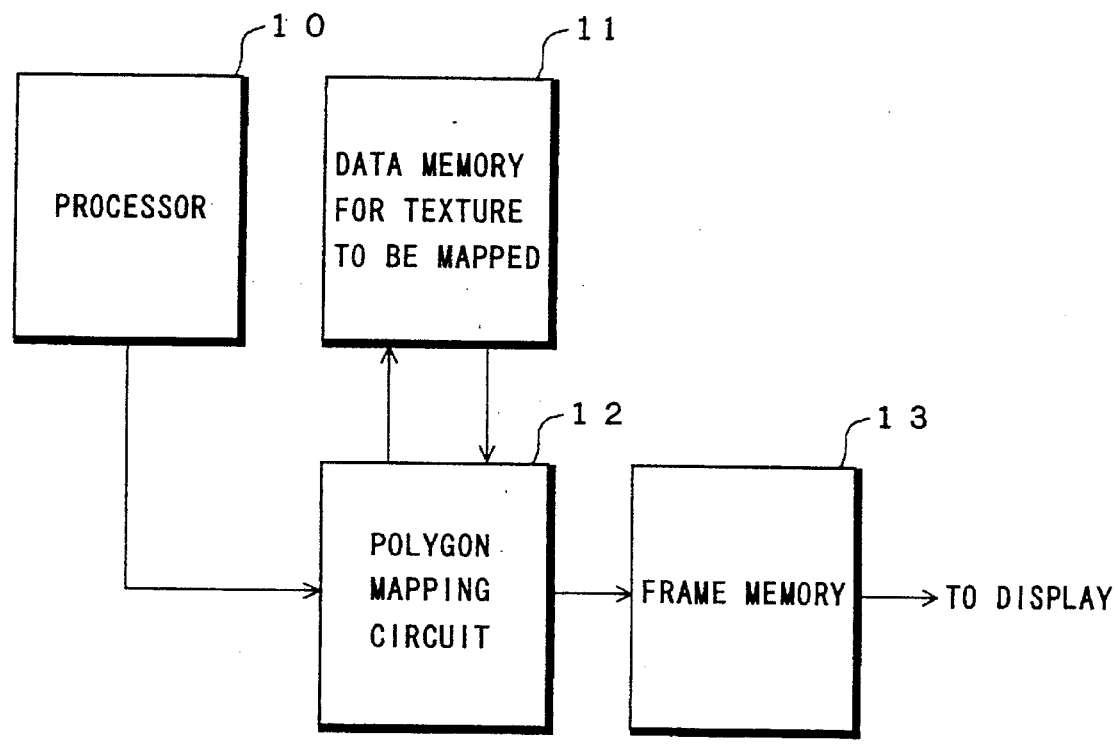
FIG. 3 is a block diagram showing a structure of a conventional image processing apparatus.

FIG. 2 is a flowchart showing an image processing operation of the image processing apparatus.

When the game is started or the demonstration is started on the display device 8, operational data generated by an operation of the manipulator 2, for example, a rotational amount of an object, is read by the processor 1 (Step S2) and polygon parameters are also read by the processor 1 (Step S4).

Based on these data, the modeling transformation, projection transformation, hidden-surface elimination and other operations are carried out to produce a new surface model (Step S6). New surface model data are sent to the frame memory 4 in the terms of surface numbers and parameters of polygons constituting the new surface model are sent to the polygon parameter memory 5 in relation to the surface numbers (Step S8).

In Step S10, thereafter, the addresses of the frame memory 4 are scanned in synchronism with the horizontal and vertical raster sweeping signals of the display device 8 to successively read surface numbers stored at the addresses in a predetermined order. In accordance with the successively read surface numbers, the corresponding polygon parameters are successively read out from the polygon parameter memory 5 and then successively sent to the mapping calculation circuit 6 together with the scanned address data.

Based on the successively sent polygon parameters and the scanned address data, the mapping calculation circuit 6 executes the calculation of designating an appropriate address (X, Y) on the texture data memory 7 to map a specified texture to the polygon of the surface numbers for each scanned address, and send an address signal indicative of the designated address to the texture data memory 7 (Step S12). As a result, texture data at the designated address (X, Y) is read from the texture data memory 7 in accordance with the address signal and then generated on the display device 8.

In Step S14, it is judged whether or not the game is finished. If the game is over, this routine is terminated. If the game is not over (NO in Step S14), another judgment is made in Step S16 as to whether or not a predetermined time has elapsed since the latest operational data were input in Step S2. If the predetermined time has not yet passed (NO in Step S16), this routine returns to Steps S10 and S12 in which the addresses of the frame memory 4 is scanned again, and the mapping calculation is executed.

The period of the predetermined time is not less than a time required for one sweeping of the display device 8, thereby assuring display of a stabilized still scene.

On the other hand, if the predetermined time has already elapsed (YES in Step S16), this routine returns to Step S2 to read new operational data to create a new game scene. The operations of Steps S2 to S16 are repeated until the game is over (YES in Step S14).

As mentioned above, a surface model is created in the processor 1. The surface model data is stored in the frame memory 4 in the term of surface numbers. Specifically, surface numbers indicative of polygons constituting the surface model are assigned at addresses of the frame memory 4. The addresses of the frame memory 4 correspond to pixels arranged on the display device 8. Parameters of each polygon are stored in the polygon parameter memory 5. The addresses of the frame memory 4 are scanned in synchronism with the horizontal and vertical sweeping signals, and scanned addresses are successively sent to the polygon parameter memory 5. The polygon parameter memory 5 successively reads out parameters of polygons of the successively sent surface numbers and sends to the mapping calculation circuit 6.

The mapping calculation circuit 6 successively calculates addresses of the texture data memory 7 storing texture data necessary to parts of each of the polygons based on the scanned addresses and the parameters of the polygons having the surface numbers stored at the respective scanned addresses, and successively sends address signals indicative of the calculated addresses to the texture data memory 7.

The texture data memory 7 successively sends texture data in accordance with the address signals to the display device 8 to generate a three-dimensional image.

The mapping of texture data is executed in accordance with the scanning of the addresses of the frame memory 4 storing the created surface model data. Accordingly, the image processing can be executed at considerably short time even if processing a three-dimensional image having an increased number of polygons or overlapped polygons.

Also, the frame memory 4, polygon parameter memory 5, mapping calculation circuit 6, texture data memory 7, and display device 8 are connected with one another in series. This will make it easier to synchronize the three-dimensional image processing with the sweeping signal of the display device 8.

Further, the new image processing of the processor 1 is suspended at least until the interval of the sweeping signal elapses, which will thus assure a stabilized image.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An image processing apparatus for use with a display device having a number of pixels arranged in a predetermined form, the processing apparatus comprising:

a processor operable to create a surface model which is defined by a number of polygons, each polygon having a surface number and a parameter;

a first memory, having addresses corresponding to the pixels of the display device, operable to store a surface number at each address to represent the surface model in terms of surface numbers;

a second memory operable to store the parameter of each polygon in correspondence to the surface number of each polygon;

a third memory operable to store texture data for each polygon at addresses arranged in a predetermined form;

a designator operable to designate an address of the first memory; and a calculator operable to calculate, based on a designated address of the first memory and the parameter of the polygon corresponding to the surface number at the designated address, an address of the third memory storing texture data corresponding to the designated address to generate an address signal indicative of the calculated address of the third memory, and to send the address signal to the third memory so that the third memory transmits the texture data stored at the calculated address to the display device for illuminating a pixel corresponding to the designated address of the first memory.

2. An image processing apparatus for use with a display device having a number of pixels arranged in a predetermined form, the processing apparatus comprising:

a processor operable to create a surface model which is defined by a number of polygons, each polygon having a surface number and a parameter;

a first memory having addresses corresponding to the pixels of the display device, and operable to store a surface number at each address to represent the surface model in terms of surface numbers;

a second memory operable to store the parameter of each polygon in correspondence to the surface number of each polygon;

the first memory and the second memory being connected with the processor in parallel;

a third memory operable to store texture data for each polygon at addresses arranged in a predetermined form;

a designator operable to designate an address of the first memory;

a calculator operable to calculate, based on a designated address of the first memory and the parameter of the polygon corresponding to the surface number at the designated address, an address of the third memory storing texture data corresponding to the designated address, to generate an address signal indicative of the calculated address of the third memory, and to send the address signal to the third memory so that the third memory transmits the texture data stored at the calculated address to the display device for illuminating a pixel corresponding to the designated address of the first memory; and the first memory, the second memory, the calculator, the third memory, and the display device being connected with one another in series.

3. An image processing apparatus as defined in claim 2, wherein:

the display device includes means for generating a sweeping signal; and the processor includes the designator which includeS means for generating and sending a scanning signal to the first memory to scan the addresses of the first memory to designate addresses one after another in synchronism with the sweeping signal.

4. An image processing apparatus as defined in claim 3, wherein:

the display device is capable of generating a sweeping signal at a predetermined interval; and the processor includes means for creating a new surface model in accordance with externally input operation data and means for suspending processing of said new surface model until the predetermined interval of the sweeping signal elapses.

* * * * *